US012797795B2

(12) United States Patent
Zuppero et al.

(10) Patent No.: US 12,797,795 B2
(45) Date of Patent: Nov. 17, 2026

(54) APPARATUS FOR FILTERING AND ISOLATING EMISSIONS FROM HYDRIDE REACTIONS

(71) Applicant: Tionesta Applied Research Corporation, Sequim, WA (US)

(72) Inventors: Anthony C. Zuppero, Escondido, CA (US); Thomas J. Dolan, Ionia, IA (US); Paul A. Crone, Sequim, WA (US)

(73) Assignee: TIONESTA APPLIED RESEARCH CORPORATION, Sequim, WA (US)

( * ) Notice: Subject to any disclaimer, the term of this patent is extended or adjusted under 35 U.S.C. 154(b) by 262 days.

(21) Appl. No.: 18/803,322

(22) Filed: Aug. 13, 2024

(65) Prior Publication Data

US 2024/0399311 A1 Dec. 5, 2024

Related U.S. Application Data

(63) Continuation-in-part of application No. 17/224,972, filed on Apr. 7, 2021, now abandoned, which is a
(Continued)

(51) Int. Cl.
*B01D 59/26* (2006.01)

(52) U.S. Cl.
CPC ........ *B01D 59/26* (2013.01); *B01D 2251/302* (2013.01); *B01D 2257/108* (2013.01); *B01D 2259/808* (2013.01)

(58) Field of Classification Search
CPC .............. B01D 59/26; B01D 2251/302; B01D 2257/108; B01D 2259/808
See application file for complete search history.

(56) References Cited

U.S. PATENT DOCUMENTS 7,005,404 B2 2/2006 He
8,419,919 B1 4/2013 Boss et al.
(Continued)

FOREIGN PATENT DOCUMENTS

CN 107190275 A * 9/2017 .............. H01M 8/22
JP 4346838 10/2009
(Continued)

OTHER PUBLICATIONS

Leggett, A., et al., "Can Solid-State Effects Enhance the Cold-Fusion Rate?,"Nature vol. 340, pp. 45-46, (1989). https://doi.org/10.1038/340045a0, Jul. 6, 1989 Jul. 1989.
(Continued)

*Primary Examiner* — Andrew Smyth
(74) *Attorney, Agent, or Firm* — BRYAN CAVE LEIGHTON PAISNER LLP

(57) ABSTRACT

An emissions-filtering reaction-isolation apparatus for stimulating hydride reactions that are confined in the apparatus and allowing any MeV ions with energy greater than approximately 2 MeV emitted to escape from the apparatus. The apparatus can include a reaction region enclosed by an envelope. The apparatus also can include one or more conductors comprising crystal films or particles of Pd, Ti, W, or Ni. The apparatus additionally can include at least two supports for each conductor. The apparatus further can include a hydrogen storage material located adjacent to the conductors. When the apparatus is stimulated by heating by one or more lasers or MeV energy particle beams, hydrogen is released from the hydrogen storage material, the heating causes the hydride reactions with the conductors, the hydride reactions increase a temperature of the apparatus providing a hydride reaction signature, and if any reactions cause emission of the ions, the ions escape from the appa-
(Continued)

ratus to allow detection of the ions. Other embodiments are described.

7 Claims, 2 Drawing Sheets

Related U.S. Application Data continuation-in-part of application No. 15/973,231, filed on May 7, 2018, now abandoned, which is a continuation-in-part of application No. 15/286,354, filed on Oct. 5, 2016, now abandoned, which is a continuation-in-part of application No. 14/933,487, filed on Nov. 5, 2015, now abandoned.

(60) Provisional application No. 63/035,587, filed on Jun. 5, 2020, provisional application No. 63/016,915, filed on Apr. 28, 2020, provisional application No. 62/237,235, filed on Oct. 5, 2015, provisional application No. 62/237,249, filed on Oct. 5, 2015, provisional application No. 62/075,587, filed on Nov. 5, 2014.

(56) References Cited

U.S. PATENT DOCUMENTS

| | | | |
|---|---|---|---|
| 2003/0112916 | A1 | 6/2003 | Keeney et al. |
| 2007/0286324 | A1 | 12/2007 | Hagelstein |
| 2008/0232532 | A1 | 9/2008 | Larsen et al. |
| 2009/0122940 | A1 | 5/2009 | Breed |
| 2010/0303188 | A1 | 12/2010 | Lawandy |
| 2014/0034116 | A1 | 2/2014 | Zuppero et al. |
| 2014/0097083 | A1 | 4/2014 | Zuppero et al. |
| 2014/0119488 | A1 | 5/2014 | Iwamura et al. |
| 2016/0232989 | A1 | 8/2016 | Zuppero et al. |

FOREIGN PATENT DOCUMENTS

| | | | |
|---|---|---|---|
| WO | WO-2009039309 A2 * | 3/2009 | ........ H01M 8/04216 |
| WO | WO-2010107844 A2 * | 9/2010 | ............... C01B 6/00 |
| WO | 2011024173 | 3/2011 | |
| WO | 2014025695 | 2/2014 | |
| WO | 2019111164 | 6/2019 | |

OTHER PUBLICATIONS

Wikipedia, https://en.wikipedia.org/wiki/Generation_(particle_physics), last edited Nov. 3, 2020. 2020.

Berlinguette, et al., "Revisiting the Cold Case of Cold Fusion," Nature vol. 570, pp. 45-51, (2019), https://doi.org/10.1038/s41586-019-1256-6, Jun. 6, 2019.

Nagel, "From Cold Fusions to Low Energy Nuclear Reactions and Beyond," USPTO Teach Fair. Jun. 2018.

Lindstrom, "Believable Statements of Uncertainty and Believable Science,"Journal of Radioanalytical and Nuclear Chemistry, vol. 311, pp. 1019-1022, https:doi.org/10.1007/s10967-016-4912-4. Feb. 2017.

Berkovich, "Calendar Variations in the Phenomena of Nature and the Apparition of Two Higgs Bosons," The George Washington University, Department of Computer Science, https://www2.seas.gwu.edu/~berkov/pubs.html, 2013 2013.

Huizenga, "Cold Fusion: The Scientific Fiasco of the Century," 1993. 1993.

Biberian. JP., et al., "Laser induced transmutation in palladium thin films in hydrogen atmosphere" ICCF23-1-07 ; 3rd International Conference on Condensed Matter Nuclear Science (ICCF-23) Jun. 9-11, 2021, in Xiamen, China. Jun. 2021.

Lipson, AG., et al. Phenomenon of an Energetic Charged Particle Emission From Hydrogen/Deuterium Loaded Metals. in Tenth International Conference on Cold Fusion. 2003. Ca, mbridge, MA: http://lenr-canr.org/acrobat/LipsonAGphenomenon.pdf. 2003 2003.

Lorusso, A., et al., Characterization of Pd-H/sub 2/ thin films irradiated by UV laser. 2003 Conference on Lasers and Electro-Optics Europe (CLEO/Europe 2003) (IEEE Cat. No.03TH8666). doi:10.1109/cleoe.2003.1313652 2003.

Ohshima, S., et al., "Verification of Excess Heat from PdDx Irradiated by Infrared Laser"; Toyota Central R& D Labs., Inc. : jcf13-proceedings Japan Cold Fussion ; ISSN 2187-2260; Proceedings of the 13th Meeting of Japan CF Research Society, JCF13 Dec. 8-9, 2012. 2012.

Benyo, T., PhD. "Lattice Confinement Fusion Gas Cycling Experiments" ARPA-E Workshop on Low-Energy Nuclear Reactions; Oct. 21-22, 2021. 2021.

Biberian, JP., et al., "Transmutation of Palladium Induced by Laser Irradiation". Condensed Matter Nucl. Sci. 37 (2023) 9-22 2023.

Zhang, H., Laser irradiation of hydrogen-containing metal anomalies lab report 202401 Qiuran lab HangZhang 715469127@qq.com From: "'Jean-Paul Biberian' via CMNS"' cmns@googlegroups.com. 2024.

Lorusso, A., et al., Measurements of new elements in Pf-H2 thin films. Laboratory of Applied Electronics, Department of Physics, University of Lecce, I.N.F.N.-Leece, C.P. 193, 73100 Lecce-I. 2003.

Hagelstein, P.L., et al., "Terahertz difference frequency response of pdd in two-laser experiments." J. Condensed Matter Nucl. Sci. 3 (2010) 59-76. Retrieved from: http://www.iscmns.org/CMNS/JCMNS-Vol3.pdf 2010.

Internet Archive of arpa-e, "Low-Energy Nuclear Reactions," https://arpa-e.energy.gov/technologies/exploratory-topics/low-energy-nuclear-reactions, available at https://web.archive.org/web/20240617144037/https://arpa-e.energy.gov/technologies/exploratory-topics/low-energy-nuclear-reactions. Jun. 17, 2024. Jun. 17, 2024.

Fralick, G.C., et al., "Transmutations Observed from Pressure Cycling Palladium Silver Metal with Deuterium Gas," International Journal of Hydrogen Energy, pp. 10-19, https://doi.org.10.1016/j.ijhydene.2020.08.287 2020.

Nassisi, V., et al., "Transmutation of Elements in Saturated Palladium Hydrides by an XeCI Excimer Laser," Fusion Technology, 33:4, 468-475, DOI: 10. 13182/FST98-A46 : http://dx.doi.org/10.13182/FST98-A46 1998.

Castellano, et al., "Nuclear Transmutation in Deutered Pd Films Irradiated by an UV Laser," in 8th International Conference on Cold Fusion, 2000, Lerici (La Spezia), Italy: Italian Physical Society, Bologna, Italy. Retrieved from: https://www.arpa-e.energy.gov/technologies/exploratory-topics/low-energy-nuclear-reactions#main-content 2000.

Campari, E.G., et al., "Photon and particle emission, heat production and surface transforamtion in Ni-H system," in Eleventh International Conference on Condensed Matter Nuclear Science, 2004, Marseille, France 2004.

Mizuno, T., et al., "Generation of Heat and Products During Plasma Electrolysis," in Tenth International Conference on Cold Fusion, 2003, Cambridge, MA: LENR-CANR.org 2003.

Kopecek, R., "Electrolysis of Titanium in Heavy Water," Dissertations and Theses, Paper 5023, 1995, https://doi.org/10.15760/etd.6899 1995.

Mastromatteo, U., et al., "Characterization of nuclear transmutations by 638 nm laser beams," 11th International Conference on Condensed Matter Nuclear Science, ICCF-11, Oct. 31, 2004, http://www.iscmns.org/iccfl 1/ppt/Mastromatteo638nm.ppt 2004.

Iwamura, Y., et al., "Transmutation Reactions Induced by Deuterium Permeation through Nano-structured Pd Multilayer Thin Film," Transactions of the American Nuclear Society, vol. 107, San Diego, California, Nov. 11-15, 2012 Nov. 2012.

Karabut, A.B. and Karabut, E.A., "Experimental Results on Excess Power, Impurity Nuclides, and X-ray Production in Experiments with a High-voltage Electric Discharge System," J. Condensed Matter Nucl. Sci. 8 (2012), pp. 139-158 2012.

Bierian, J.P., "Fission of palladium thin films in H2 atmosphere under laser irradiation," Jan. 18, 2021 Online Workshop: "Low Energy Nuclear Reactions Workshop in memory of Dr. M. Srinivasan" (Jan. 22-24, 2021) Jan. 18, 2021.

(56) References Cited

OTHER PUBLICATIONS

Barrowes, B., et al., "Low Energy Nuclear Reaction (LENR) Research at US Army—CRREL," USACE—ERDC—CRREL ICCF24 @ Solid State Energy Summit 2022, Jul. 25-28, 2022, Computer History Museum, 1401 N Shoreline Blvd., Mountain View, CA 94043 Jul. 2022.
Zhang, Q., et al., Repetition Experiment of Laser Deuterium (Hydrogen) Palladium DataWeco Social Innovation Data, Qiuran Lab, https://w.lenr-forum.com/attachment/23900-reptition-experiment-of-laser-deuterium-hydrogen-palladium-pdf/ 2023.
"Jean-Paul Biberian' via CMNS" cmns@googlegroups.com, To: CMNS cmns@googlegroups.com, Date: Jul. 10, 2023, 1:23 AM, Subject: Re: CMNS: Cold fusion laser experiment of hydrogen carrying material in Qiuran Laboratory 20230627 Jul. 10, 2023.
Cartlidge, "Google fails in search for cold fusion", Physics World 32, No. 7 (2019): 4. 2019.
Gibney, "Google revives controversial cold-fusion experiments", Nature 569, No. 7758 (2019): 611-611. 2019.
Christy, R.F., "The Coupling of Angular Momenta in Nuclear Reactions," Physical Review, vol. 89, No. 4, pp. 839-842 Feb. 15, 1953.
Houari, A., et al., "Electronic Structure and Crystal Phase Stability of Palladium Hydrides," arXiv: 1411.0542v1, [cond-mat.mtrl-sci], Nov. 3, 2014. 2014.
"Direct and Indirect Band Gaps," Wikipedia, May 3, 2012. 2012.
Larue, J., et al., "Vibrationally Promoted Electron Emission at a Metal Surface: Electronic Kinetic Energy Distributions," Phys. Chem. Chem. Phys., 2011, 13, 97-99, Nov. 15, 2010. Nov. 15, 2010.
Alvarez, L.W., et al., "Catalysis of Nuclear Reactions by u Mesons," Letters to the Editor, pp. 1127-1128, Dec. 17, 1956. Dec. 17, 1956.
Li, A., "Interaction of Nanoparticles With Radiation," Astrophysics of Dust, ASP Conference Series, vol. 000, Nov. 4, 2003. Nov. 4, 2003.
Bleser, E. J., et al., "Muonic Molecules in Liquid Hydrogen," Physical Review, vol. 132, No. 6, pp. 2679-2691, Dec. 15, 1963. Dec. 1963.
Dufour, J., et al., "Cold Fusion by Sparking in Hydrogen Isotopes Energy Balances and Search for Fusion By- Products," A Strategy to Prove the Reality of Cold Fusion, in Fourth International Conference on Cold Fusion, 1993, Lahaina, Maui: Electric Power Research Institute, 3412 Hillview Avenue, Palo Alto, CA 94304, 1993. 1993.
Inagakia, M., et al., "Muon Transfer Rates from Muonic Hydrogen Atoms to Gaseous Benzene and Cyclohexane," Journal of Nuclear and Radiochemical Sciences, vol. 18, pp. 5-8, 2018. 2018.
Iwamura, Y., et al., "Transmutation Reactions Induced by Deuterium Permeation through Nano-Structured Pd Multilayer Thin Film," American Nuclear Society, vol. 107, San Diego, CA, Nov. 11-15, 2012. Nov. 2012.
Jackson, J. D., "Catalysis of Nuclear Reactions between Hydrogen Isotopes by u Mesons," Physical Review, vol. 106, No. 2, p. 330, Apr. 15, 1957. Apr. 1957.
Kaneko, K., "Cold Fusion" in U.S. Patent, Successful Replication, Re-Evaluation is Accelerating (translation), in Nihon Keizai Shimbun, 2016, http://lenr-canr.org/acrobat/KanekoKcoldfusion.pdf, San Diego, USA, Nov. 11-15, 2012. Nov. 2012.
Karabut, A.B., et al., "Experimental Results on Excess Power, Impurity Nuclides, and X-ray Production in Experiments with a High-Voltage Electric Discharge System," J. Condensed Matter Nucl. Sci. 8 (2012) 139-158, 2012. 2012.
Langmuir, I, "Langmuir—Excess Energy In Atomic Hydrogen Torch," http://chavascience.com/en/hydrogen/langmuir-excess-energy-from-hydrogen, Apr. 10, 2018. Apr. 2018.
Levi, G., et al., "Observation of Abundant Heat Production from a Reactor Device and of Isotopic Changes in the Fuel," Accessed at URL: http://lenr-canr.org/acrobat/LeviGobservatio.pdf, www.sifferkoll.se/sifferkoll/wp-content/uploads/2014/10/LuganoReportSubmit.pdf, 2014. 2014.
"The Moller's Atomic Hydrogen Generator Tests by JL Naudin," http://jlnlabs.online.fr/mahg/tests/index.htm, Jun. 26, 2018. Jun. 2018.
Savvatimova, I.B., "Transmutation of Elements in Low-Energy Glow Discharge and the Associated Processes," J. Condensed Matter Nucl. Sci. 6 (2012) 181-198, 2012. 2012.
Takshashi, A., et al., "Brief Summary Report of MHE Project Phenomenology and Controllability of New Exothermic Reaction," Technical Report, DOI: 10.13140/RG.2.2.31393.92006. Jan. 2017.
United States Patent & Trademark Office, "Examiner's Appendix: LENR Fleischmann-Pons Devices." 2017.
Widom, A., et al., "Ultra Low Momentum Neutron Catalyzed Nuclear Reactions on Metallic Hydride Surfaces", arXiv: cond-mat/0505026v1 [cond-mat.str-el], May 2, 2005. May 2005.
Tennfors, E., "On the Idea of Low-Energy Nuclear Reactions in Metallic Lattices by Producing Neutrons From Protons Capturing 'Heavy' Electrons," The European Physical Journal Plus (2013) 128: 15, Feb. 15, 2013. Feb. 2013.
Stacey, Weston M., Jr., "Reactor Prospects of Muon-Catalyzed Fusion of Deuterium and Tritium Concentrated In Transition Metals," Fusion Technology, vol. 16, pp. 268-275, Sep. 1989. Sep. 1989.
Strasser, P., et al., "Muon Catalyzed Fusion Experiments on Muonic Deuterium Atom Deceleration in Thin Solid Deuterium Films," Elsevier Science B.V., Physics Letters B 368 (1996) 32-38, Jan. 25, 1996. Jan. 1996.
International Search Report for PCT/US2015/059218, mailed Jan. 20, 2016. Jan. 20, 2016.
Urutskoev, L. I., "Review of Experimental Results on Low-Energy Transformation of Nucleus," RECOM Inst. Kurchatov, Moscow, Annales de la Fondation Louis de Broglie, vol. 29, Hors série 3, 2004, 1149-1164, 2004. 2004.
LaRue, J. L., et al., "Electron Kinetic Energies from Vibrationally Promoted Surface Exoemission: Evidence for a Vibrational Autodetachment Mechanism," J. Phys. Chem. A 2011, 115, 14306-14314, dx.doi.org/10.1021/jp205868g, Nov. 23, 2011. Nov. 23, 2011.
International Search Report and Written Opinion for PCT Application No. PCT/US2019/031201, mailed Dec. 18, 2019. 2019.
Bush, R., et al. "Evidence for Electrolytically Induced Transmutation and Radioactivity Correlated with Excess Heat in Electrolytics Cell with Light Water Rubidium Salt Electrolytes," Physics Department, California State Polytechnic University and ENECO, 10.1.1.380.3084, pp. 27-46, 1994. 1994.
Iwamura, Y., et al., "Elemental Analysis of Pd Complexes: Effects of D2 Gas Permeation," Jpn. J. Appl. Phys., vol. 41, pp. 4642-4650, 2002. 2002.
Mills, R., et al. "Power Determination and Hydino Product Characterization of Ultra-Low Field Ignition of Hydrated Silver Shots," Chinese Journal of Physics, 2018, doi: 10.1016/j.cjph.2018.04.015, 2018. 2018.
Mizuno, T., et al., "Anomalous Energy Generation During Conventional Electrolysis," The 12th International Conference on Condensed Matter Nuclear Science, 2005. 2005.
Mossier-Boss, Dr. Pamela A., et al., "Investigation of Nano-Nuclear Reactions in Condensed Matter," DTRA (Defense Threat Reduction Agency) Reports, 2016. 2016.
Nienhaus, H., et al., "Electron-Hole Pair Creation at AG and CU Surfaces by Adsorption of Atomic Hydrogen and Deuterium," Physical Review Letters, vol. 82, No. 2, Jan. 11, 1999. 1999.
Kalinowski, "Catalysis, Heavy Fermions, Solitons, Cold Fusion, Low Energy Nuclear Reactions (LENR) and all that," https://vixra.org/pdf/1504.0073v5.pdf, 2015. 2015.
Vysotskii, "On Problems of Widom-Larsen Theory Applicability to Analysis and Explanation of Rossi Experiments," J. Condensed Matter Nucl. Sci 13 (2014), pp. 615-623, 2014. 2014.

* cited by examiner

APPARATUS FOR FILTERING AND ISOLATING EMISSIONS FROM HYDRIDE REACTIONS

CROSS-REFERENCE TO RELATED APPLICATIONS

This patent application is a continuation-in-part of U.S. patent application Ser. No. 17/224,972, filed Apr. 7, 2021, which is a continuation-in-part of U.S. patent application Ser. No. 15/973,231, filed May 7, 2018, which is a continuation-in-part of U.S. patent application Ser. No. 15/286,354, filed Oct. 5, 2016, which claims the benefit of U.S. Provisional Application No. 62/237,249, filed Oct. 5, 2015, and U.S. Provisional Application No. 62/237,235, filed Oct. 5, 2015. U.S. patent application Ser. No. 15/286,354 also is a continuation-in-part of U.S. patent application Ser. No. 14/933,487, filed Nov. 5, 2015, and International Patent Application No. PCT/US2015/59218, filed Nov. 5, 2015. U.S. patent application Ser. No. 14/933,487 and International Patent Application No. PCT/US2015/59218 each claim the benefit of U.S. Provisional Application No. 62/075,587, filed Nov. 5, 2014, and U.S. Provisional Application No. 62/237,235. U.S. patent application Ser. No. 17/224,972 also claims the benefit of U.S. Provisional Application No. 63/016,915, filed Apr. 28, 2020, and U.S. Provisional Application No. 63/035,587, filed Jun. 5, 2020.

International Patent Application Nos. PCT/US2019/031201 and PCT/US2015/59218; U.S. patent application Ser. Nos. 17/224,972, 15/973,231, 15/286,354, and 14/933,487; and U.S. Provisional Application Nos. 63/035,587, 63/016,915, 62/237,249, 62/237,235, and 62/075,587 are incorporated herein by reference in their entirety. If there are any conflicts or inconsistencies between this patent application and these incorporated applications, this patent application governs herein.

TECHNICAL FIELD

This disclosure relates generally to apparatuses for filtering and isolating emissions from reactions in solid state materials, such as reactions in certain solid-state systems emitting energetic isotopes.

DESCRIPTION OF THE BACKGROUND

In 2020, Fralick et al. of NASA Glenn Research Center reported (in a peer-reviewed journal) that a simple chemical diffusion of deuterium gas through thin-walled tubes of PdAg produced explosions emitting ions not originally present-novel isotopes. See Fralick G C et al., "Transmutations observed from pressure cycling palladium silver metals with deuterium gas," International Journal of Hydrogen Energy, https://doi.org/10.1016/j.ijhydene.2020.08.287 (2024). Fralick et al. included references of multiple, similar experiments claiming novel isotopes during thirty years of observations worldwide, continuing to the present.

In each case hydrogen or deuterium in the presence of conducting crystals was energized in multiple ways to react to produce the claimed novel isotopes. Several new isotopes were identified, but some had ppm concentrations which could not be measured quantitatively. The one property consistently confirmed was the novel isotope energy. Radiation dosimeters indicated isotope energies of 1-10 mega electron-volts (MeV).

It would be advantageous to have an apparatus to evaluate whether such reactions occur, and to filter and isolate emissions from such reactions.

BRIEF DESCRIPTION OF THE DRAWINGS

To facilitate further description of the embodiments, the following drawings are provided in which.

Figure 1:
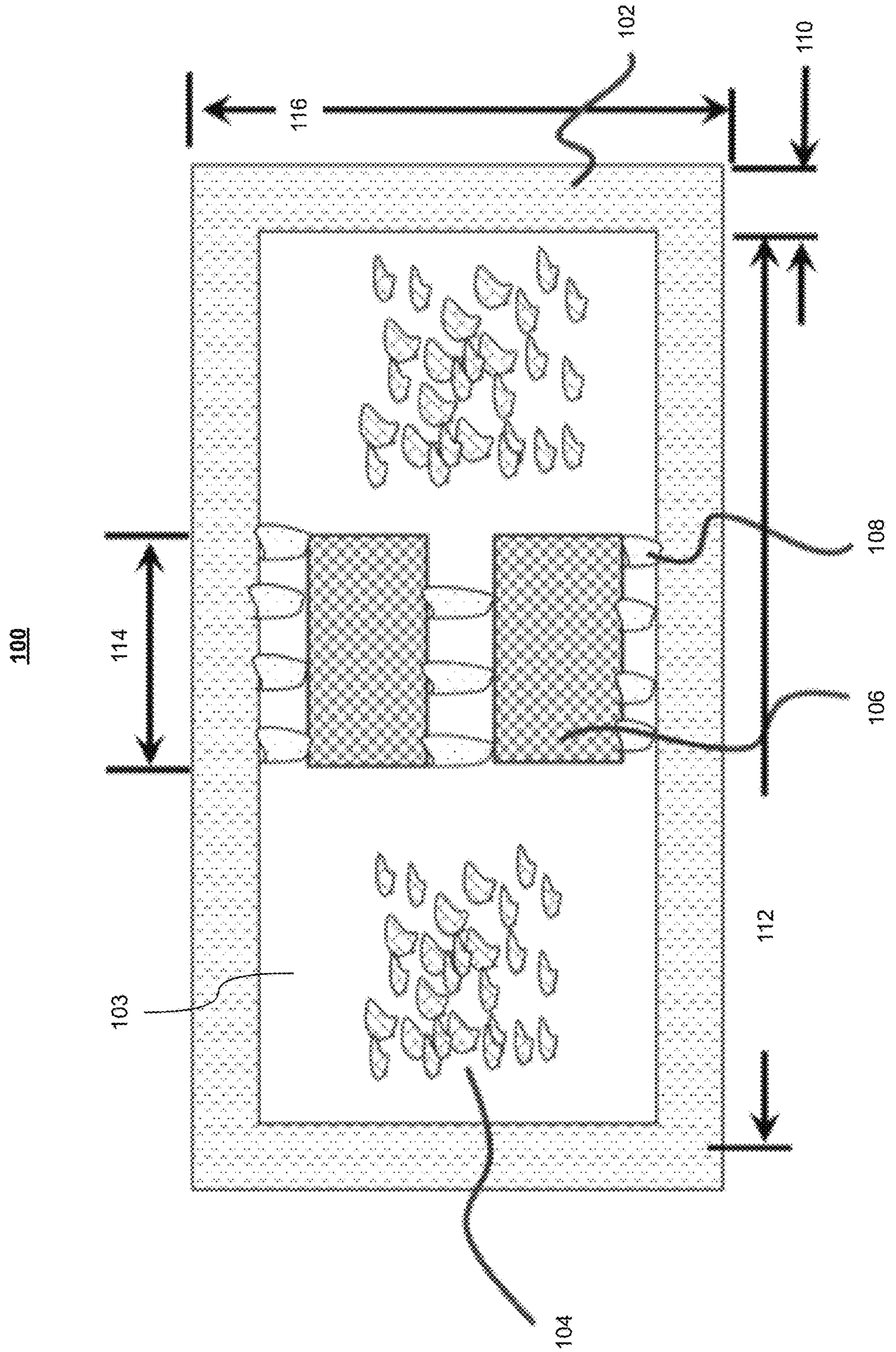
FIG. 1 illustrates an apparatus that provides a reaction isolator that can test whether energetic ions are generated by a chemical hydride reaction, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant. "Electrical coupling" and the like should be broadly understood and include coupling involving any electrical signal, whether a power signal, a data signal, and/or other types or combinations of electrical signals. "Mechanical coupling"

and the like should be broadly understood and include mechanical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXAMPLES OF EMBODIMENTS

Most of the mid-periodic table isotopes with approximately 1-10 MeV can pass through a material with thickness of less than approximately 1000 nanometers (nm), so they could readily escape from the crystallite reaction regions, which can have diameters of approximately 500 nm. In a number of embodiments, the chemical reactions and their debris can be encapsulated within an apparatus with approximately 1000 nm-thick chamber walls, and the energetic isotopes can escape and be measured. Since conventional chemical reactions cannot produce MeV level emissions, the presence of such energetic isotopes would indicate that nuclear reactions are occurring. In many embodiments, the apparatus can be utilized to test the veracity of the phenomenon of MeV level emissions of isotopes.

In many embodiments, the apparatus can provide a chemical hydride reaction test capsule that contains the ingredients such as reactants, crystallites, hydrogen, and/or deuterium sources. In some embodiments, the reactant can be a crystal lattice atom. In some embodiments, the capsule can hold the ingredients in place, stimulate chemical hydride reactions, allow any energetic generated novel isotopes to escape, confine chemical reaction debris, and/or facilitate measurement of the reaction rates and products.

Turning to the drawings, FIG. 1 illustrates an apparatus 100 that provides a reaction isolator that can test whether energetic ions are generated by a chemical hydride reaction. Apparatus 100 is merely exemplary, and embodiments of the apparatus are not limited to those shown or described herein. The apparatus can be provided in many different embodiments, with various different components thereof. The chemical reaction can occur using hydrogen or deuterium and a reactant in a crystal lattice when stimulated by heat, light, or MeV ions. If the chemical hydride-reactant reactions yield MeV isotopes not originally present, the isotopes can be measured outside the isolator. Signature electromagnetic emissions, including X-rays or Gamma Rays may escape the isolator, and probing x-rays or gamma rays may penetrate the isolator. All other mass emissions can be contained within an envelope 102.

There is currently no known physics that allows a chemical hydride reaction to produce elements not originally present. Apparatus 100 can enable the hydride reaction by providing conducting crystals 106 and reservoirs 104 of hydrogen or deuterium. When the reservoirs are heated by external means to release hydrogen, at least surface hydrides can promptly form with the conductors. Apparatus 100 can replicate the reaction conditions claimed to stimulate hydride reactions, including surface hydride reactions. Hydrides also can form within the conductors depending on the properties of the conductors.

The chemical hydride reaction also can release a heat signature. The temperature of the apparatus 100 can be monitored as a signal of and evidence of chemical hydride reaction. Temperature can be measured using optical means.

If energetic new elements are detected, then nuclear reaction claims are verified. If no such particles are detected (above cosmic rays and natural radioactivity) after evidence that chemical hydride reactions were stimulated, then nuclear reaction claims are dubious. This testing is the purpose of the reaction isolator provided by apparatus 100.

Biberian Protocol Reaction

Biberian et al. (2021, 2023, 2024) reported the following enigmatic observation (paraphrased): "When one square centimeter of a film of palladium 250 nm thick is immersed in ambient temperature hydrogen at 2 atmospheres and 1 $mW/mm^2$ of red laser pointer light, energetic bursts of new elements appear at a rate of ~1 per square centimeter per week." Jean Paul Biberian, "Fission of palladium thin films in H2 atmosphere under laser irradiation," Online Workshop: "Low Energy Nuclear Reactions Workshop in memory of Dr M. Srinivasan" (Jan. 22-24, 2021), Jan. 18, 2021. See also, Jean-Paul Biberian, Pamela Mosier-Boss, Larry Forsley, "Laser induced transmutation in palladium thin films in hydrogen atmosphere," ICCF23-I-07; 3rd International Conference on Condensed Matter Nuclear Science (ICCF-23), Jun. 9-11, 2021, in Xiamen, China.

Many international teams have reported similar ion emissions using functionally identical protocols. Palladium, nickel, or titanium were claimed to react with hydrogen or deuterium when bathed in thermal photons, far IR laser photons, and red, green, blue or UV photons. The Biberian Protocol did not exhibit chemical reaction debris, other than the claimed novel ion elements.

The size and composition of apparatus 100 can be used in conjunction with detectors to measure any nuclear reaction rates and products. The rates and products will provide valuable data for confirmation or rejection of theories dealing with lattice assisted nuclear reactions (LANR) (also called low energy nuclear reactions (LENR).

Multiple reports and funded research from premier US Government laboratories claim that the entire class of such claimed emissions are nuclear transmutation fragments. The reports claim these hydride reactions are transmutation reaction branches creating ions not originally present in the chemical hydride. The ions appear to create clear visible features within 100 microns of the visible site of the bursts. Examples of this research include research by NASA Glenn, US DOE ARPA-E, US Naval Surface Warfare Center, US Army Corp of Engineers, and others. For example, in February 2023, the US Department of Energy (DOE) ARPA-E awarded $10 million in funding for eight projects working to determine whether low-energy nuclear reactions (LENR) could be the basis for a potentially transformative carbon-free energy source." Based on ARPA-E implying that these reactions exist, although the underlying physics is still unknown, it would be beneficial to evaluate whether these reactions are occurring.

Reaction Isolator Design

In many embodiments, apparatus 100 can provide a hydride reaction isolator. Apparatus 100 can allow stimulation of the reaction and detection of signals confirming the hydride reaction occurred. It can isolate and confine all chemical products of a chemical hydride reaction, including any debris associated with chemical reactions within the capsule. It also can enable detectors to measure and quantify MeV ions that escape from the capsule. The transparency of envelope 102 (e.g., the capsule wall) to such ions can be provided by limiting a thickness 110 of the wall to less than approximately 1000 nm.

A depth 116 of apparatus 100 can be less than about approximately 3000 nm, while other dimensions 112 of apparatus 100 can be more than about approximately 3000 nm. In some embodiments, multiple isolators (e.g., apparatus 100) can be placed adjacent to each other in a plane. A thickness of the isolator, including the wall, can be chosen so that MeV ions encounter less than approximately 2000 nanometers of any matter when escaping from the center of the isolator to the outside. At least 10% of MeV ions with atomic number greater than about 50 are estimated to escape the isolator for detection. Reports claim isotopes with atomic number less than 50.

The reaction isolator design of apparatus 100 can be configured to provide stimulation conditions for the Biberian Protocol Reaction. The reactions can include reactions in thin film regions that are approximately 250 nm thick. In some embodiments, the films or particles of crystals 106 can have dimensions 114 of approximately 20 nm to 500 nm, and/or less than approximately 1000 nm. In some embodiments, apparatus 100 can include the use of titanium, nickel or palladium crystals or particles, or hydride thereof, inside the isolator wall. These metals can be used as hydrogen tanks or reservoirs, releasing hydrogen upon heating. Burst reactions claimed to emit multiple isotopes began in approximately 120 nm thick crystals of Pd, in experimental tests with thicknesses ranging from approximately 20 to 150 nm. See Castellano et al., "Nuclear Transmutation in Deutered Pd Films Irradiated by an UV Laser," in 8th International Conference on Cold Fusion, Lerici (La Spezia), Italy: Italian Physical Society, Bologna, Italy (2000).

Various kinds of films or particles can be used in the interior of the isolator. The films or particles can include other elements claimed to react when placed on or in the crystals. The crystals can include mixtures of crystals with different element compositions. Mass-energy considerations predict that nearly all elements have an isotope that could react with hydrogen or deuterium, so those elements can be used as dopants.

Energy measurements claim ion energies in the range 1-10 MeV. Ions can include Na, Al, P, S, Si, Cl, Ca, Mn, Fe, Ni, Zn, for example, as reported by Biberian (2021), as well as protons, helium, carbon, nitrogen, and oxygen. Some mid-periodic table ions have been found microns deep into reaction crystals, substantiating the 1000 nm thickness limitation.

Hydrogen Reservoirs

Apparatus 100 can provide hydrogen (or deuterium) for the reaction. Reservoirs (e.g., 104) of hydrogen can be placed inside the reaction isolator (e.g., apparatus 100). Heating typical hydrogen reservoirs to temperatures less than about 500° C. (Celsius) can release hydrogen gas. For example, $LiAlH_4$ releases hydrogen at 150 to 170° C. Hydrides of titanium and palladium also release hydrogen when heated. The reservoirs are placed next to the conducting crystallites and inside the isolator.

It can be advantageous to use a conductor crystal that forms stable hydrides, such as $TiH_2$, $NiH_2$, PdH.

Structural Framework

Structures can take many forms, such as beams, rods, particles, meshes, aerogels. Structures can be formed from materials that uptake hydrogen and become hydrogen storage materials.

Apparatus 100 can include spacers 108, which can be structural elements used to separate crystallite films, particles or structures, allowing hydrogen to access crystallite surfaces, and/or allowing only MeV ions to escape. Spacer sizes can be approximately 100-300 nm. Convenient spacers, such as particles, may be randomly intermixed with conducting crystals.

Hydride Reaction Initiation

In many embodiments, the reaction can be stimulated by heating the isolator apparatus to release hydrogen. Laser beams and energetic particle beams can provide heat. When the hydrogen reservoirs are heated to temperatures ranging from 150 to 500° C., hydrogen can be released. The presence of hydrogen with the conducting crystallites can cause hydride reactions, even at low ambient temperatures.

EXEMPLARY EMBODIMENTS

In some embodiments, an emissions-filtering reaction isolation apparatus (e.g., 100) can stimulate known hydride reactions in a chamber designed to confine all elements originally present (including chemical reaction products and debris) in the chamber, and to allow any ions with energy greater than approximately 2 MeV to escape from the capsule. Apparatus 100 can include a reaction region 103 enclosed by envelope 102. In some embodiments, the enclosed reaction region (e.g., 103) can have a depth, including envelope 102, less than approximately 3000 nm, and a minimum breadth and width of approximately 3000 nm. In some embodiments, envelope 102 can have thickness 110 of less than approximately 1000 nm. Envelope 102 can totally enclose the contents of the reaction region. In some embodiments, envelope 102 also can include of one or more layers of a refractory material with high tensile strength, such as graphene or oxides, carbides, or nitrides of one or more of the following elements: silicon, aluminum, magnesium, calcium, boron, chromium, or zirconium.

The apparatus also can include one or more conducting crystal films or particles of Pd, Ti, W, Ni, or similar crystals (e.g., 106), with sizes between approximately 20 and 500 nm. At least two supports (e.g., spacers 108) for each film, with sizes between approximately 20 and 250 nm of a non-metallic refractory material, such as oxides, carbides, or nitrides of one or more of the following elements: silicon, aluminum, magnesium, calcium, boron, chromium, or zirconium.

The apparatus also can include a hydrogen storage material (e.g., reservoir 104) located next to the films. The reservoir can be $LiAlH_4$ or hydrides of nickel, titanium and palladium.

In many embodiments, when the capsule of the apparatus is stimulated by heating by lasers or MeV energy particle beams, hydrogen can be released from the hydrogen storage material. The heat can cause hydride reactions with the conductors. The reactions can increase the temperature of the apparatus providing a hydride reaction signature. If any reactions cause emission of the ions (with energy greater than approximately 2 MeV), those ions can escape from the capsule, enabling detectors to quantify the amount, energy and type of ions emitted, and x-ray fluorescence probes to monitor the signals of growing (or vanishing) element concentrations.

In some embodiments, the envelope can include a window of material transparent to the specific laser used, such as sapphire or aluminum oxide.

In some embodiments, the conductor crystals can have holes or spaces with hole dimensions approximately 2 nm or larger, the surfaces formed by the holes provide surfaces for adsorption/desorption of hydrogen or deuterium.

In some embodiments, the reaction particles can include crystals, hydrides, and structure in each particle.

Figure 2:
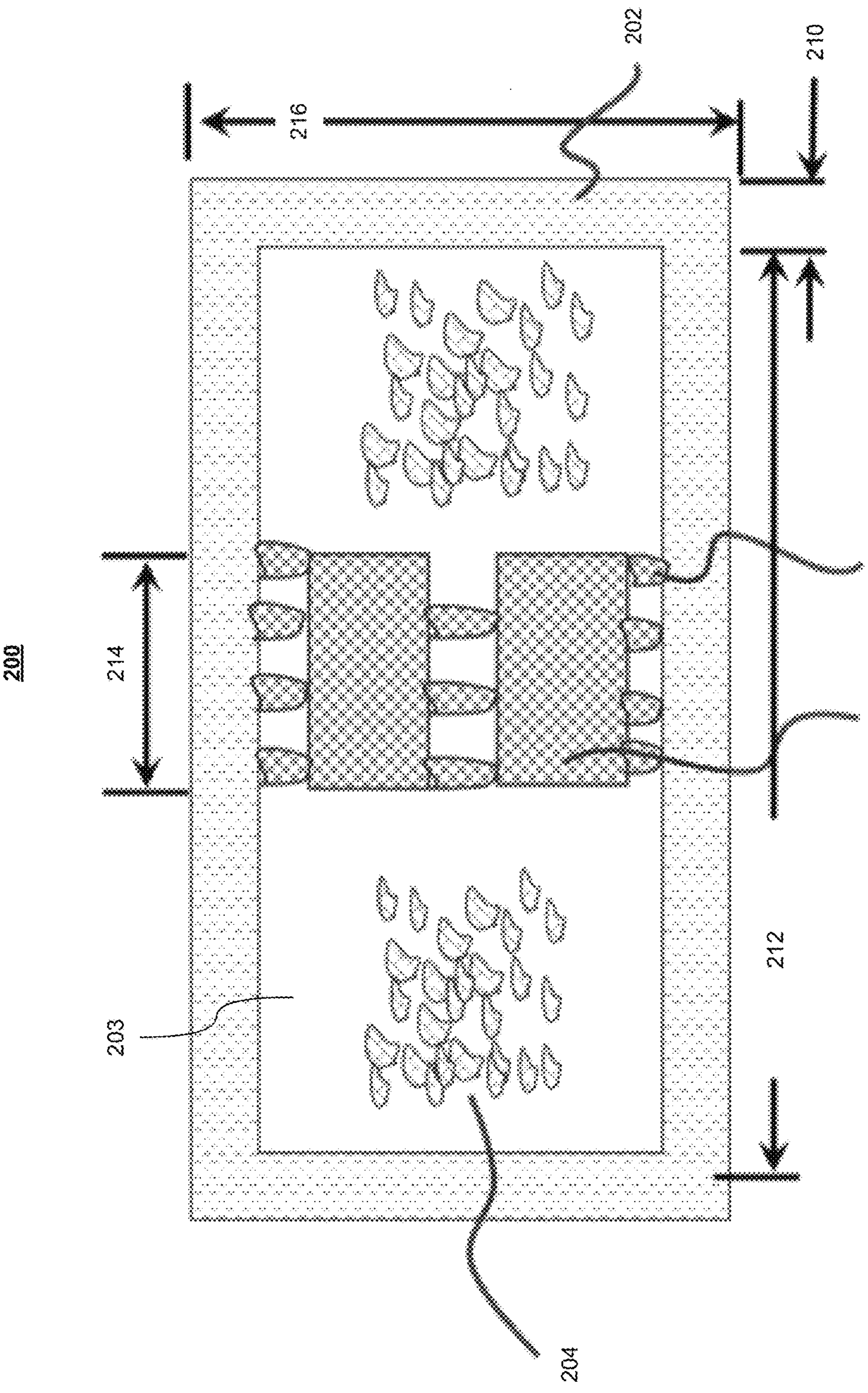
FIG. 2 illustrates an apparatus that provides a reaction isolator that can test whether energetic ions are generated by a chemical hydride reaction, according to another embodiment.

In addition to apparatus 100, the reaction capsule can be provided in other forms, which are contemplated. For example, FIG. 2 illustrates an apparatus 200 that provides a reaction isolator that can test whether energetic ions are generated by a chemical hydride reaction. Apparatus 200 is merely exemplary, and embodiments of the apparatus are not limited to those shown or described herein. The apparatus can be provided in many different embodiments, with various different components thereof. Apparatus 200 can be similar to apparatus 100 (FIG. 1), and various components of apparatus 200 can be similar or identical to various components of apparatus 100 (FIG. 1)

In many embodiments, apparatus 200 can include an envelope 202, which can be similar or identical to envelope 102 (FIG. 1). Envelope 202 can enclose a reaction region 203, which be similar or identical to reaction region 103 (FIG. 1). In some embodiments, envelope 202 can have thickness 210 of less than approximately 1000 nm. A depth 216 of apparatus 200 can be less than about approximately 3000 nm, while other dimensions 212 of apparatus 200 can be more than about approximately 3000 nm. Apparatus 200 can include reservoirs 204, which can be similar or identical to reservoirs 104 (FIG. 1). In many embodiments, apparatus 200 can include conducting crystal films 206, which can be similar to conducting crystals or particles 106 (FIG. 1). In many embodiments, apparatus 200 can include particles of conducting crystal material 208, which can be similar to spacers 108 (FIG. 1). Dimensions 214 of conducting crystal films 206 can be less than approximately 1000 nm.

In some embodiments, an emissions-filtering reaction isolation apparatus (e.g., 200) can stimulate known hydride reactions in a chamber designed to confine all elements originally present (including chemical reaction products and debris) in the chamber, and to allow any ions with energy greater than approximately 2 MeV to escape from the capsule. The apparatus can include a reaction region enclosed by an envelope. In some embodiments, the enclosed reaction region can have a depth, including the envelope, less than approximately 3000 nm, and a minimum breadth and width of approximately 3000 nm. In some embodiments, the envelope can have a thickness of less than approximately 1000 nm. The envelope can totally enclose the contents of the reaction region. In some embodiments, the envelope also can include one or more layers of a refractory material with high tensile strength, such as graphene or oxides, carbides, or nitrides of one or more of the following elements: silicon, aluminum, magnesium, calcium, boron, chromium, or zirconium.

The apparatus also can include one or more conducting crystal films of Pd, Ti, W, Ni, or similar crystals, with film thicknesses between approximately 20 and 500 nm. At least four particles can be distributed across the film area, with sizes between approximately 50 and 100 nm of a same material as the crystal films.

The apparatus also can include a hydrogen storage material located next to the films. The hydrogen storage material can be $LiAlH_4$ or hydrides of nickel, titanium and palladium.

In many embodiments, when the capsule of the apparatus is stimulated by heating by lasers or MeV energy particle beams, hydrogen can be released from the hydrogen storage material. The heat can cause hydride reactions with the conductors. The reactions can increase the temperature of the apparatus providing a hydride reaction signature. If any reactions cause emission of ions (with energy greater than approximately 2 MeV), those ions can escape from the capsule, enabling detectors to quantify the amount, energy and type of ions emitted, and x-ray fluorescence probes to monitor the signals of growing (or vanishing) element concentrations.

In additional embodiments, an emissions-filtering reaction isolation apparatus can stimulate known hydride reactions in a chamber designed to confine all elements originally present (including chemical reaction products and debris) in the chamber, and to allow any ions with energy greater than approximately 2 MeV to escape from the capsule. The apparatus can include a reaction region enclosed by an envelope. In some embodiments, the enclosed reaction region can have a depth, including the envelope, less than approximately 3000 nm, and a minimum breadth and width of approximately 3000 nm. In some embodiments, the envelope can have a thickness of less than approximately 1000 nm. The envelope can totally enclose the contents of the reaction region. In some embodiments, the envelope also can include one or more layers of a refractory material with high tensile strength, such as graphene or oxides, carbides, or nitrides of one or more of the following elements: silicon, aluminum, magnesium, calcium, boron, chromium, or zirconium.

The apparatus also can include one or more conducting blocks of Pd, Ti, W, Ni, or similar crystals, with block thicknesses between approximately 100 and 900 nm. The blocks can have holes punched in them or channels carved into them so that the holes or channels have access to the hydrogen.

The apparatus also can include a hydrogen storage material located next to the films. The hydrogen storage material can be $LiAlH_4$ or hydrides of nickel, titanium and palladium.

In many embodiments, when the capsule of the apparatus is stimulated by heating by lasers or MeV energy particle beams, hydrogen can be released from the hydrogen storage material. The heat can cause hydride reactions with the conductors. The reactions can increase the temperature of the apparatus providing a hydride reaction signature. If any reactions cause emission of ions (with energy greater than approximately 2 MeV), those ions can escape from the capsule, enabling detectors to quantify the amount, energy and type of ions emitted, and x-ray fluorescence probes to monitor the signals of growing (or vanishing) element concentrations.

Although the apparatuses for filtering and isolating emissions from hydride reactions have been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that (a) various elements of FIGS. 1-2 herein may be modified, combined with each other, and/or interchanged with each other, and (b) the embodiments described with reference to FIGS. 1-2 do not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An emissions-filtering reaction-isolation apparatus for stimulating hydride reactions that are confined in the apparatus and allowing any ions with energy greater than approximately 2 MeV emitted to escape from the apparatus, the apparatus comprising:

- a reaction region enclosed by an envelope, wherein the apparatus, including the envelope, has a depth of less than approximately 3000 nm and has a breadth and width of at least approximately 3000 nm, wherein the envelope is less than approximately 1000 nm thick, and wherein the envelope comprises one or more layers of a refractory material comprising one or more of graphene or oxides, carbides, or nitrides of silicon, aluminum, magnesium, calcium, boron, chromium, or zirconium;
- one or more conductors comprising crystal films or particles of Pd, Ti, W, or Ni, wherein the conductors have dimensions of approximately 20 to 500 nm;
- at least two supports for each conductor, wherein the supports have dimensions of approximately 20 to 250 nm, and wherein the supports comprise a non-metallic refractory material comprising oxides, carbides, or nitrides of silicon, aluminum, magnesium, calcium, boron, chromium, or zirconium; and
- a hydrogen storage material located adjacent to the conductors, the hydrogen storage materials comprising LiAlH4 or hydrides of nickel, titanium or palladium,
- wherein, when the apparatus is stimulated by heating by one or more lasers or MeV energy particle beams, hydrogen is released from the hydrogen storage material, the heating causes the hydride reactions with the conductors, the hydride reactions increase a temperature of the apparatus providing a hydride reaction signature, and if any reactions cause emission of the ions, the ions escape from the apparatus to allow detection of the ions.

2. The emissions-filtering reaction-isolation apparatus of claim 1, wherein the envelope comprises a window of material transparent to the one or more lasers.

3. The emissions-filtering reaction-isolation apparatus of claim 2, wherein the material transparent to the one or more lasers comprises sapphire or aluminum oxide.

4. The emissions-filtering reaction-isolation apparatus of claim 1, wherein the conductors comprise holes or spaces having dimensions of at least approximately 2 nm and provide surfaces for adsorption or desorption of hydrogen or deuterium.

5. The emissions-filtering reaction-isolation apparatus of claim 1, wherein reaction particles resulting from the hydride reactions comprise crystals and hydrides.

6. An emissions-filtering reaction-isolation apparatus for stimulating hydride reactions that are confined in the apparatus and allowing any ions with energy greater than approximately 2 MeV emitted to escape from the apparatus, the apparatus comprising:

- a reaction region enclosed by an envelope, wherein the apparatus, including the envelope, has a depth of less than approximately 3000 nm and has a breadth and width of at least approximately 3000 nm, wherein the envelope is less than approximately 1000 nm thick, and wherein the envelope comprises one or more layers of a refractory material comprising one or more of graphene or oxides, carbides, or nitrides of silicon, aluminum, magnesium, calcium, boron, chromium, or zirconium;
- one or more conducting crystal films of Pd, Ti, W, or Ni having a film thicknesses of approximately 20 and 500 nm;
- at least four particles distributed adjacent to and having a same material as the one or more conducting crystal films, wherein the at least four particles each have dimensions of approximately 50 to 100 nm;
- a hydrogen storage material located adjacent to the one or more conducting crystal films, the hydrogen storage materials comprising LiAlH4 or hydrides of nickel, titanium or palladium,
- wherein, when the apparatus is stimulated by heating by one or more lasers or MeV energy particle beams, hydrogen is released from the hydrogen storage material, the heating causes the hydride reactions with the one or more conducting crystal films, the hydride reactions increase a temperature of the apparatus providing a hydride reaction signature, and if any reactions cause emission of the ions, the ions escape from the apparatus to allow detection of the ions.

7. An emissions-filtering reaction-isolation apparatus for stimulating hydride reactions that are confined in the apparatus and allowing any ions with energy greater than approximately 2 MeV emitted to escape from the apparatus, the apparatus comprising:

- a reaction region enclosed by an envelope, wherein the apparatus, including the envelope, has a depth of less than approximately 3000 nm and has a breadth and width of at least approximately 3000 nm, wherein the envelope is less than approximately 1000 nm thick, and wherein the envelope comprises one or more layers of a refractory material comprising one or more of graphene or oxides, carbides, or nitrides of silicon, aluminum, magnesium, calcium, boron, chromium, or zirconium;
- one or more conducting blocks of Pd, Ti, W, or Ni having a block thicknesses of approximately 100 to 900 nm, wherein the one or more conducting blocks comprise holes punched or channels carved therein to allow access to hydrogen;
- a hydrogen storage material located adjacent to the one or more conducting blocks, the hydrogen storage materials comprising LiAlH4 or hydrides of nickel, titanium or palladium,
- wherein, when the apparatus is stimulated by heating by one or more lasers or MeV energy particle beams, hydrogen is released from the hydrogen storage material, the heating causes the hydride reactions with the one or more conducting blocks, the hydride reactions increase a temperature of the apparatus providing a hydride reaction signature, and if any reactions cause emission of the ions, the ions escape from the apparatus to allow detection of the ions.

* * * * *